United States Patent [19]
Grosskinsky et al.

[11] 4,387,082
[45] Jun. 7, 1983

[54] REMOVAL OF NITROUS OXIDE FROM EXIT GASES CONTAINING THIS COMPOUND DURING THE PRODUCTION OF HYDROXYLAMMONIUM SALTS

[75] Inventors: Alfred-Otto Grosskinsky; Elmar Frommer, both of Ludwigshafen, Fed. Rep. of Germany; Guenther Rapp, deceased, late of Ludwigshafen, by Ruth E. Rapp, Legal Representative; Erwin Thomas, Freinsheim; Ruediger Schmitz, Lambsheim, both of Fed. Rep. of Germany

[73] Assignee: BASF Aktiengesellschaft, Fed. Rep. of Germany

[21] Appl. No.: 344,613

[22] Filed: Feb. 1, 1982

[30] Foreign Application Priority Data

Mar. 4, 1981 [DE] Fed. Rep. of Germany ....... 3108075

[51] Int. Cl.$^3$ ...................... C01B 21/20; C01B 21/00
[52] U.S. Cl. ..................................... 423/387; 423/235
[58] Field of Search ....................... 423/235, 387, 400; 55/68

[56] References Cited

U.S. PATENT DOCUMENTS

| 2,823,101 | 2/1958 | Meier et al. | 423/387 |
| 3,009,779 | 11/1961 | Wintersberger et al. | 423/388 |
| 3,060,133 | 10/1962 | Jockers et al. | 423/387 |
| 3,959,946 | 5/1976 | Graf et al. | 423/387 |
| 4,246,250 | 1/1981 | Moesdijk | 423/387 |

OTHER PUBLICATIONS

Mellor, *Comp. Treat. on Inorg. & Theor. Chem.*, vol. VIII, Sup. 1, John Wiley & Sons, NY, 1968, p. 199.

Primary Examiner—O. R. Vertiz
Assistant Examiner—Gregory A. Heller
Attorney, Agent, or Firm—Keil & Witherspoon

[57] ABSTRACT

A process for removing nitrous oxide from exit gases which contain this compound and have been obtained in the preparation of hydroxylammonium salts by catalytic reduction of nitric oxide with hydrogen in an aqueous solution of a mineral acid, in the presence of a suspended noble metal catalyst, wherein the exit gases are washed with water.

1 Claim, No Drawings

REMOVAL OF NITROUS OXIDE FROM EXIT GASES CONTAINING THIS COMPOUND DURING THE PRODUCTION OF HYDROXYLAMMONIUM SALTS

The present invention relates to a process for removing nitrous oxide from exit gases which contain this compound and have been obtained in the preparation of hydroxylammonium salts by catalytic reduction of nitric oxide with hydrogen in an aqueous solution of a mineral acid, in the presence of a suspended noble metal catalyst.

In the preparation of hydroxylammonium salts by catalytic hydrogenation of nitric oxide with hydrogen, nitrous oxide is formed as one of the by-products, and, since conversion is not quantitative, the resulting exit gas is a mixture containing hydrogen, nitric oxide and nitrous oxide. Gas mixtures of this type are explosive, especially under superatmospheric pressure. However, since the exit gases contain useful starting materials, it is necessary to recycle them. European Patent application Ser. No. 8,479 discloses the preparation of hydroxylammonium salts by catalytic reduction of nitric oxide with hydrogen in two separate reaction zones connected in series, using very pure starting gases. However, the use of such gases industrially is very expensive. Moreover, no indication is given as to how the exit gases can be re-used safely. The above European Patent application also discloses the addition of from 10 to 80% by volume of an inert gas to the nitric oxide and hydrogen used, in order to obtain a non-explosive exit gas mixture. However, the presence of an inert gas interferes with recycling of these exit gases, and no indication is given as to how to overcome this problem.

It is an object of the present invention to treat the exit gases which are obtained in the preparation of hydroxylammonium salts by catalytic reduction of nitric oxide with hydrogen and which contain nitrous oxide in such a manner that they can be re-used safely for the synthesis of hydroxylammonium salts.

We have found that this object is achieved by a process for removing nitrous oxide from exit gases which contain this compound and have been obtained in the preparation of hydroxylammonium salts by catalytic reduction of nitric oxide with hydrogen in an aqueous solution of a mineral acid, in the presence of a suspended noble metal catalyst, wherein the exit gases are washed with water.

The novel process has the advantages that nitrous oxide is removed in a simple manner from the exit gases obtained in the synthesis of hydroxyl-ammonium salt, and that the exit gases thus purified can be safely re-used for the synthesis of hydroxylammonium salt, especially under superatmospheric pressure, without the nitrous oxide content of the exit gas reaching an explosive level.

Hydroxylammonium salts are prepared from nitric oxide and hydrogen. As a rule, the molar ratio of hydrogen to nitric oxide is from 1.5:1 to 6:1, and particularly good results are obtained when a molar ratio of from 3.5:1 to 5:1 is maintained in the reaction zone. It is not necessary to use pure starting gases, and the nitric oxide and hydrogen used in the reaction can contain, for example, up to 10% by volume of an inert gas, eg. nitrogen.

It is advantageous to use a strong mineral acid, eg. hydrochloric acid, nitric acid, sulfuric acid or phosphoric acid, as the acid. The acidic salts thereof, eg. ammonium bisulfate, are also suitable. Sulfuric acid and/or ammonium bisulfate are particularly preferred. As a rule, a 4-6 N aqueous acid is used initially, and the acid concentration is not permitted to fall below 0.2 N during the reaction.

The reaction is advantageously carried out at from 30° to 80° C., in particular from 40° to 60° C. As a rule, the reaction is carried out under atmospheric or superatmospheric pressure, for example up to 100 bar. Particularly good space/time yields are obtained under a pressure of from 1.5 to 30 bar.

The catalytic reduction is carried out in the presence of a suspended noble metal catalyst, advantageously a supported platinum catalyst. Platinum on a charcoal carrier, especially on graphite, has proved particularly suitable. A supported catalyst of this type preferably contains from 0.2 to 5% by weight of platinum, and as a rule additionally contains one or more elements of main groups V and/or VI of the Periodic Table, with an atomic weight of >31, as well as lead and/or mercury as poisons. Suitable catalysts and their preparation are described, for example, in German Pat. Nos. 920,963, 956,038, 945,752 and 1,088,037. During the reaction, the noble metal catalyst is kept in suspension by appropriate means, for example by stirring. A suitable continuous process is described, for example, in German Pat. No. 1,177,118.

Since the reaction of nitric oxide with hydrogen is not quantitative, the exit gases obtained as a rule contain from 73 to 85% by volume of hydrogen, from 5 to 13% by volume of nitric oxide, from 3 to 8% by volume of nitrous oxide and, depending on the purity of the nitric oxide and hydrogen used, up to 30% by volume of inert gases, eg. nitrogen. A typical mixture contains, for example, from 73 to 77% by volume of hydrogen, from 8 to 12% by volume of nitric oxide, from 5 to 7.5% by volume of nitrous oxide and from 7 to 10% by volume of nitrogen. These exit gases containing nitrous oxide are washed with water, advantageously in countercurrent in a suitable apparatus, for example a column. Examples of suitable columns are perforated tray, bubble-cap tray or packed columns. As a rule, such columns have from 3 to 10 trays. Washing is advantageously carried out at from 20° to 60° C., and from 80 to 300 l of water per m$^3$ of exit gas are preferably used. The procedure can be carried out under atmospheric or superatmospheric pressure, for example up to 50 bar, advantageously from 1.5 to 30 bar. If the exit gas is obtained under superatmospheric pressure, for example from 5 to 20 bar, in the synthesis of hydroxylammonium salts, it is advantageous to wash it under the pressure under which it is obtained. In addition to hydrogen, nitric oxide and inert gases, an exit gas purified in this manner still contains not more than 1.5% by volume of nitrous oxide.

The exit gases purified by washing with water, according to the invention are advantageously re-used for the preparation of hydroxylammonium salts. They can be admixed to the fresh supply of hydrogen, but they are advantageously supplemented with nitric oxide, until the molar ratios mentioned at the outset are re-established, and used in a separate reaction zone for the preparation of hydroxyl-ammonium salts, in particular under pressures of from 1.5 to 30 bar.

Hydroxylammonium salts can be used for the preparation of oximes.

The Example which follows illustrates the process of the invention.

EXAMPLE 5 l of 4.3 N sulfuric acid and 500 g of a platinum/graphite supported catalyst containing 0.5% by weight of platinum are initially introduced into each of 5 stirred kettles in a cascade. 2 m³ (S.T.P.) per hour of hydrogen and 1.2 m³ (S.T.P.) per hour of 96% strength by volume nitric oxide are passed into each stirred kettle from below, while stirring vigorously. At the same time, 56.3 l per hour of 4.3 N sulfuric acid and catalyst are introduced into the first stirred kettle, and the corresponding amount of reaction mixture is removed from the fifth stirred kettle. The catalyst is separated off and recycled to the first stirred kettle. The reaction is carried out at 40° C. and under a pressure of 20 bar. A total of 2,720 l per hour of exit gas of the following composition is obtained: 76.6% by volume of hydrogen, 12.6% by volume of nitric oxide, 7.4% by volume of nitrous oxide and 8.8% by volume of nitrogen. Without being let down, ie. under the pressure under which it is obtained (20 bar), the exit gas is introduced into the bottom of a pressure column which is 60 mm in diameter and 1,000 mm in height and is packed with Raschig rings. At the same time, the column is charged from the top with 300 l per hour of water at 20° C. 2,580 l per hour of purified gas of the following composition are taken off at the top: 78.3% by volume of hydrogen, 12.2% by volume of nitric oxide, 0.4% by volume of nitrous oxide and 9.1% by volume of nitrogen. The washed exit gas is then reacted with an aqueous solution of sulfuric acid containing suspended platinum catalyst in a 6th stirred kettle under 18 bar and at 40° C., with the addition of 850 l per hour of nitric oxide.

The resulting exit gas, containing 52.4% by volume of hydrogen, 8.0% by volume of nitric oxide, 7.1% by volume of nitrous oxide and 32.5% by volume of nitrogen, is not explosive under the pressure employed.

We claim:

1. In a process for producing hydroxylammonium salts by:
    reacting nitric oxide with hydrogen in an aqueous solution of a mineral acid and in the presence of a suspended noble metal catalyst;
    the improvement comprises washing the exit gases from the reaction vessel with from 80 to 300 l of water per m³ of exit gases under a pressure of from 1.5 to 30 bar at a temperature of from 20° to 60° C. to remove nitrous oxide from the exit gases, and thereafter;
    recycling the treated exit gases to the reaction vessel.

* * * * *